United States Patent
Takeyama et al.

(10) Patent No.: US 8,488,617 B2
(45) Date of Patent: Jul. 16, 2013

(54) RAILWAY-TRAIN COMMUNICATION APPARATUS

(75) Inventors: Masayuki Takeyama, Tokyo (JP); Shogo Tatsumi, Tokyo (JP); Minoru Yoshida, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 806 days.

(21) Appl. No.: 12/531,891

(22) PCT Filed: Mar. 17, 2008

(86) PCT No.: PCT/JP2008/054898
§ 371 (c)(1),
(2), (4) Date: Sep. 18, 2009

(87) PCT Pub. No.: WO2008/114777
PCT Pub. Date: Sep. 25, 2008

(65) Prior Publication Data
US 2010/0091663 A1 Apr. 15, 2010

(30) Foreign Application Priority Data

Mar. 20, 2007 (JP) ................. 2007-073365

(51) Int. Cl.
*H04L 12/28* (2006.01)
(52) U.S. Cl.
USPC .......................................... 370/400; 370/242
(58) Field of Classification Search
None
See application file for complete search history.

(56) References Cited

U.S. PATENT DOCUMENTS

| 5,675,238 A | 10/1997 | Asao | |
|---|---|---|---|
| 5,953,340 A * | 9/1999 | Scott et al. | 370/401 |
| 6,002,692 A * | 12/1999 | Wills | 370/465 |
| 2002/0101865 A1* | 8/2002 | Takagi et al. | 370/360 |
| 2008/0235138 A1* | 9/2008 | Yokota et al. | 705/52 |

FOREIGN PATENT DOCUMENTS

| DE | 10 2005 050 050 | 4/2006 |
|---|---|---|
| EP | 1 404 063 | 3/2004 |
| EP | 1 536 594 | 6/2005 |
| JP | 58-183586 | 10/1983 |
| JP | 08-163899 | 6/1996 |
| JP | 9-307580 A | 11/1997 |
| JP | 2000-014644 A | 1/2000 |

(Continued)

OTHER PUBLICATIONS

Supplementary European Search Report dated Apr. 6, 2011, issued in the corresponding European Patent Application No. 08722292.3-1249.

(Continued)

*Primary Examiner* — Kevin C Harper
*Assistant Examiner* — Rhonda Murphy
(74) *Attorney, Agent, or Firm* — Buchanan Ingersoll & Rooney PC

(57) ABSTRACT

A railway-train communication apparatus transmits a first transmission signal flowing through an inter-car network between cars of a railway train and a second transmission signal flowing through an in-car network in each of the cars. A node device includes a first signal converter and a second signal converter that perform a signal conversion between the first transmission signal and the second transmission signal and a layer 2 switch arranged between the first signal converter and the second signal converter for connecting the first signal converter and the second signal converter. A first controller is connected to the layer 2 switch.

13 Claims, 12 Drawing Sheets

FOREIGN PATENT DOCUMENTS

| | | |
|---|---|---|
| JP | 2000-106285 | 4/2000 |
| JP | 2001-00373 A | 1/2001 |
| JP | 2005-117373 A | 4/2005 |
| JP | 2005-223394 A | 8/2005 |
| JP | 2006-149161 A | 6/2006 |
| TW | 200730382 | 8/2007 |

OTHER PUBLICATIONS

Office Action dated Oct. 28, 2011, issued in the corresponding Taiwanese Patent Application No. 097109588.

International Search Report of Application No. PCT/JP2008/054898 dated Apr. 22, 2008.

Non-English version of Written Opinion of the International Searching Authority of Application No. PCT/JP2008/054898 dated Apr. 22, 2008.

Decision of a Patent Grant issued in corresponding Japanese Application No. 2009-505215 dated Oct. 27, 2009, and an English Translation thereof.

* cited by examiner

FIG.9

|  |  | Node number | Car number | Car number | ID number | Car number | ID number | Train End |
|---|---|---|---|---|---|---|---|---|
| A-Car (1010) | Car Status for Node-1 | 1 | 1010 | 1011 | 1 | - | - | 1 |
|  | Car Status for Node-2 | 2 | 1010 | 1011 | 2 | - | - | 1 |
| B-Car (2021) | Car Status for Node-1 | 1 | 2021 | 2020 | 1 | 1011 | 4 | 0 |
|  | Car Status for Node-2 | 2 | 2021 | 2020 | 2 | 1011 | 3 | 0 |

FIG.11

| 31-24 | 23-10 | 9 | 8-4 | 3 | 2 | 1 | 0 |
|---|---|---|---|---|---|---|---|
| 10 (constant) | Car Number (0-16382) | Node Number (0/1) | Reserved (0) | ID in a car ||||

Sub net mask=255.0.0.0

Node Number:    0: Node-1, 1: Node-2
ID in a car:    0000: N/A, 0010: CNC1, 0011: CNC2,

RAILWAY-TRAIN COMMUNICATION APPARATUS

TECHNICAL FIELD

The present invention relates to a railway-train communication apparatus that is provided in a railway train and provides a communication function of a railway-train communication system.

BACKGROUND ART

There has conventionally been a railway-train communication apparatus that includes a configuration control unit that has a carrier sense multiple access type interface, a switching hub that has a branch function for a transmission path, and a switch that switches off input and output signals of the switching hub. The railway-train communication apparatus controls a communication state in the up/down directions of the transmission path by connecting or disconnecting the switch and recognizes configuration and connection states of communication equipment within a railway train (for example, see Patent Document 1).

The railway-train communication apparatus disclosed in Patent Document 1 uses the switching hub that connects communication apparatuses in one-to-one communication method to evade a fault and removes a master communication apparatus to prevent communication stop in a car. An object of the railway-train communication apparatus is to improve system reliability.

[Patent Document 1] Japanese Patent Application Laid-open No. 2005-117373

DISCLOSURE OF INVENTION

Problem to be Solved by the Invention

However, in the railway-train communication apparatus disclosed in Patent Document 1, consideration is given to a fault of a transmission path or a device constructed in a car or between cars but not to signal quality of the transmission path. Therefore, there is concern whether transmission data is surely transmitted to communication apparatuses in other cars or whether a transmission speed decreases due to the increase of re-transmission frequency of transmission data.

The present invention has been achieved in view of the above problems, and an object of the invention is to provide a railway-train communication apparatus that secures adaptability to a transmission path having low signal quality and improves the certainty of data transmission.

Means for Solving Problem

To solve the above problem and to achieve the object, a railway-train communication apparatus according to the present invention performs transmission processes of transmitting a first transmission signal flowing through an inter-car network constructed between cars of a railway train and a second transmission signal flowing through an in-car network constructed in each of the cars. The railway-train communication apparatus includes a node device including a first signal converter and a second signal converter that perform a mutual signal conversion between the first transmission signal and the second transmission signal and a layer 2 switch arranged between the first signal converter and the second signal converter for connecting the first signal converter and the second signal converter; and a first controller that is connected to the layer 2 switch. The first signal converter converts the first transmission signal received from an adjacent inter-car network on a first side into the second transmission signal and outputs the second transmission signal to the layer 2 switch, and converts the second transmission signal received from the layer 2 switch into the first transmission signal and outputs the first transmission signal to the adjacent inter-car network on the first side. The second signal converter converts the first transmission signal received from an adjacent inter-car network on a second side into the second transmission signal and outputs the second transmission signal to the layer 2 switch, and converts the second transmission signal received from the layer 2 switch into the first transmission signal and outputs the first transmission signal to the adjacent inter-car network on the second side.

Effect of the Invention

According to the railway-train communication apparatus according to the present invention, the first and the second signal converters that perform mutual signal conversion between the first transmission signal and the second transmission signal are connected to the layer 2 switch that is connected to the first controller. Therefore, the adaptability to a transmission path having low signal quality can be secured and the certainty of data transmission can be improved.

BRIEF DESCRIPTION OF DRAWINGS

FIG. 9 is a diagram illustrating car status information set in the connection mode illustrated in FIG. 8.

FIG. 11 is a diagram illustrating an example of an IP address system in the railway-train communication system according to the present embodiment.

EXPLANATIONS OF LETTERS OR NUMERALS

Figure 1:
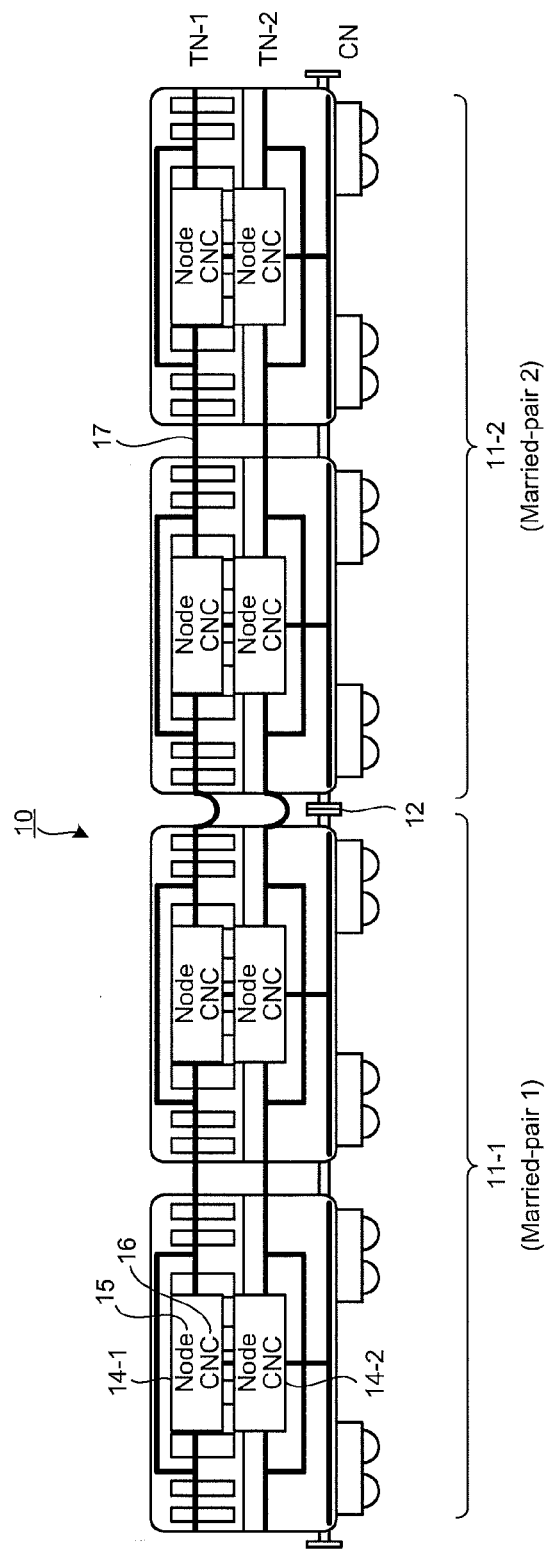
FIG. 1 is a diagram illustrating a schematic configuration of a railway-train communication system in which railway-train communication apparatuses according to a preferable embodiment of the present invention are provided.

10 railway train
11 car group 12, 27 automatic coupler
14 railway-train communication apparatus
16, 82, 83 network controller
17 transmission path
20 railway-train communication apparatus
21 node device
22 network controller
23, 24, 25 serial line
26 parallel interface circuit
28 operation control board
31 converter
32 switching hub
33 bypass relay
34 bypass line
51 Ethernet (registered trademark) transmitter/receiver circuit
52 buffer memory
53 HDLC transmitter/receiver circuit
55 pulse transformer
56 Ethernet (registered trademark) controller
57, 58, 59 FIFO-type memory
61 HDLC controller
62 RS-422 transceiver
63 pulse transformer
64 capacitor
66 microprocessor
67 WDT (watch dog timer)
68 relay
69 switch
70 inductance coil

BEST MODE(S) FOR CARRYING OUT THE INVENTION

Exemplary embodiments of a railway-train communication apparatus according to the present invention will be explained below in detail with reference to the accompanying drawings. The present invention is not limited to the embodiments explained below.

(Brief Description of Railway-Train Communication System)

First, a brief description of a railway-train communication system in which railway-train communication apparatuses are provided will be explained. FIG. 1 is a diagram illustrating a schematic configuration of the railway-train communication system in which the railway-train communication apparatuses according to a preferable embodiment of the present invention are provided. In an example illustrated in FIG. 1, a railway train 10 includes a car group 11-1 (Married_pair_1) and a car group 11-2 (Married_pair_2) of which each includes two cars. These groups are connected to each other via an automatic coupler 12. Each car of the railway train 10 includes railway-train communication apparatuses 14 (14-1 and 14-2) that respectively include a node device (node) 15 and a network controller 16 that is a first controller. The railway-train communication apparatuses 14 provided in the cars are connected via transmission paths 17 to constitute inter-car networks (TN-1 and TN-2) that are a dual-system (redundant-system) network in the railway train 10. In addition, each car includes an in-car network (CN) different from the inter-car network. However, the in-car network (CN) is connected to the inter-car networks (TN-1 and TN-2) via the network controller 16.

(Configuration of Railway-Train Communication Apparatus)

Figure 2:
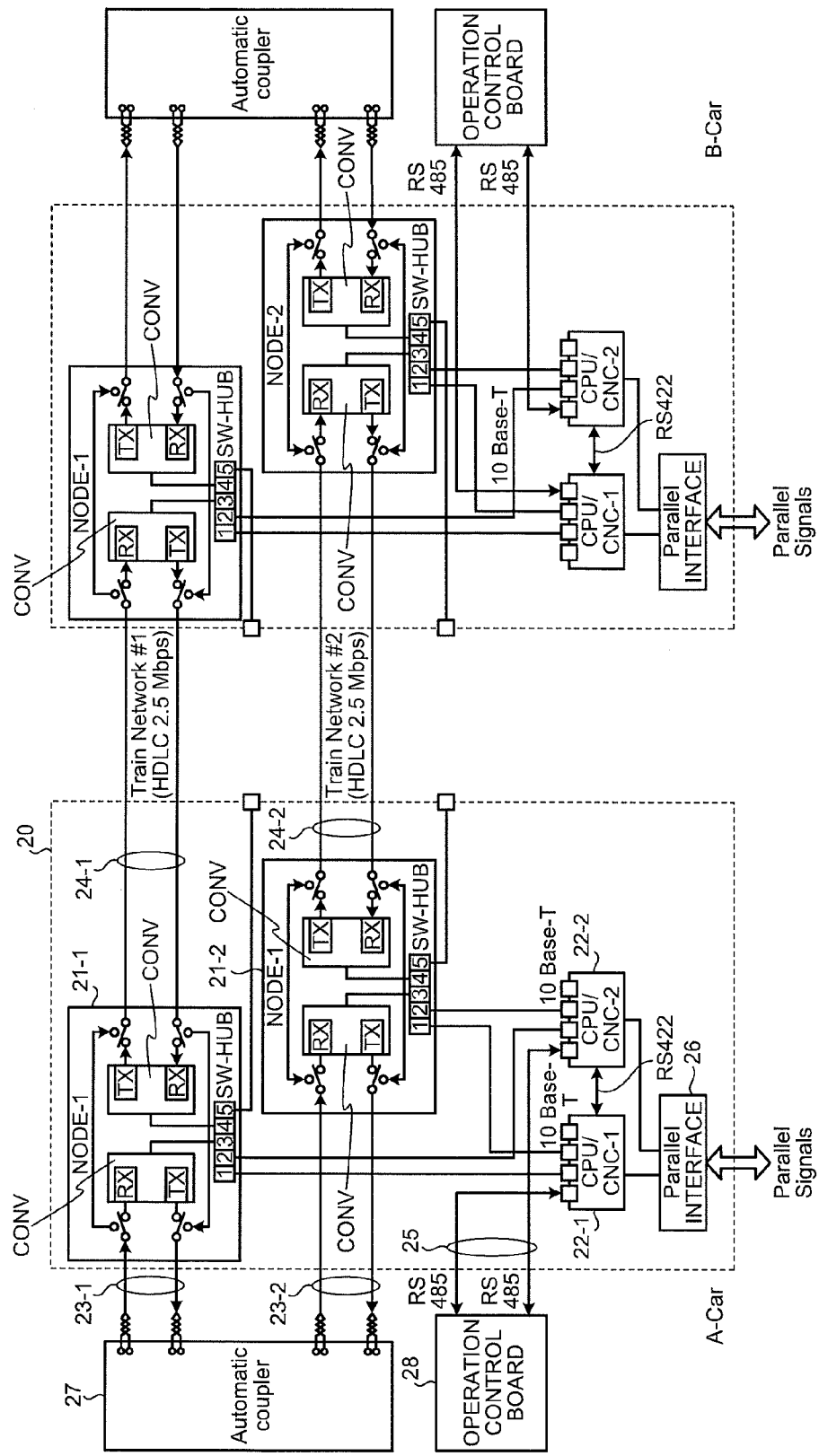
FIG. 2 is a diagram illustrating a configuration and a connection mode of the railway-train communication apparatus according to the present embodiment.

Next, a configuration and a connection mode of a railway-train communication apparatus will be explained. FIG. 2 is a diagram illustrating a configuration and a connection mode of a railway-train communication apparatus according to the present embodiment. In FIG. 2, a railway-train communication apparatus 20 includes a node device 21-1 that constitutes one of a main series and a sub series of a dual system, a node device 21-2 that constitutes the other of the dual system, and network controllers 22-1 and 22-2 that are respectively connected to the node devices 21-1 and 21-2. The railway-train communication apparatus 20 further includes therein various types of interface circuits/lines (serial lines 23 to 25 and a parallel interface circuit 26). In this case, the serial line 23 is an interface that is connected to an automatic coupler 27 and communicates with a node device of another car group adjacent to the present car group via an electric contact point of the automatic coupler 27. The serial line 24 is an interface that communicates with node devices of the other car in the same car group. Both lines are components that take on a communication function of the inter-car network (TN-1 and TN-2) as described above. On the other hand, the serial line 25 and the parallel interface circuit 26 are a line and a circuit that transmit operation control information (a braking command, velocity information, switching information of a door), signal information of ATC (automatic train control), or the other navigation information to an operation control board 28. These line and circuit are components that take on a communication function of the in-car network (CN) as described above.

The node devices 21-1 and 21-2 are separated from each other. The node device 21-1 is respectively connected to serial lines 23-1 and 24-1 and the node device 21-2 is respectively connected to serial lines 23-2 and 24-2. Data transmission between the node devices 21 uses an HDLC signal (a first transmission signal) to be described below. On the other hand, the node devices 21 are respectively connected to the network controllers 22 by, for example, a 10-BaseT cable. In other words, data transmission between the node devices 21 and the network controllers 22 uses an Ethernet (registered trademark) signal (a second transmission signal).

In addition, the 10-BaseT that is one connection mode of a CSMA/CD (carrier sense multiple access/collision detection) method is used as a network interface between the node devices 21 and the network controllers 22. However, another connection mode can be employed. For example, in addition to the CSMA/CD (carrier sense multiple access/collision detection) method, there can be employed various types of carrier sense multiple access methods such as CSMA/ACK (acknowledgment), CSMA/CA (collision avoidance), CSMA/CD/ACK (collision detection/acknowledgment), CSMA/CD/MACK (collision detection/monitor acknowledgment), and CSMA/NCACK (non-collision acknowledgment). Therefore, a signal appropriate to each method can be used. However, assuming that the 10-BaseT is used, this is preferable to the present system because an advantage of excellent versatility due to the variousness of commercial products, an advantage of easy cable placing, and an advantage of cost and size can be effectively utilized.

Moreover, it is reasonable that data transmission between the node devices 21 can use a signal other than the HDLC signal. However, the HDLC is preferable to the present system as a reliable data link control because the HDLC signal has an advantage that a data transfer control by bit and a strict error control by CRC (cyclic redundancy check) can be performed.

(Configuration of Node Device)

Figure 3:
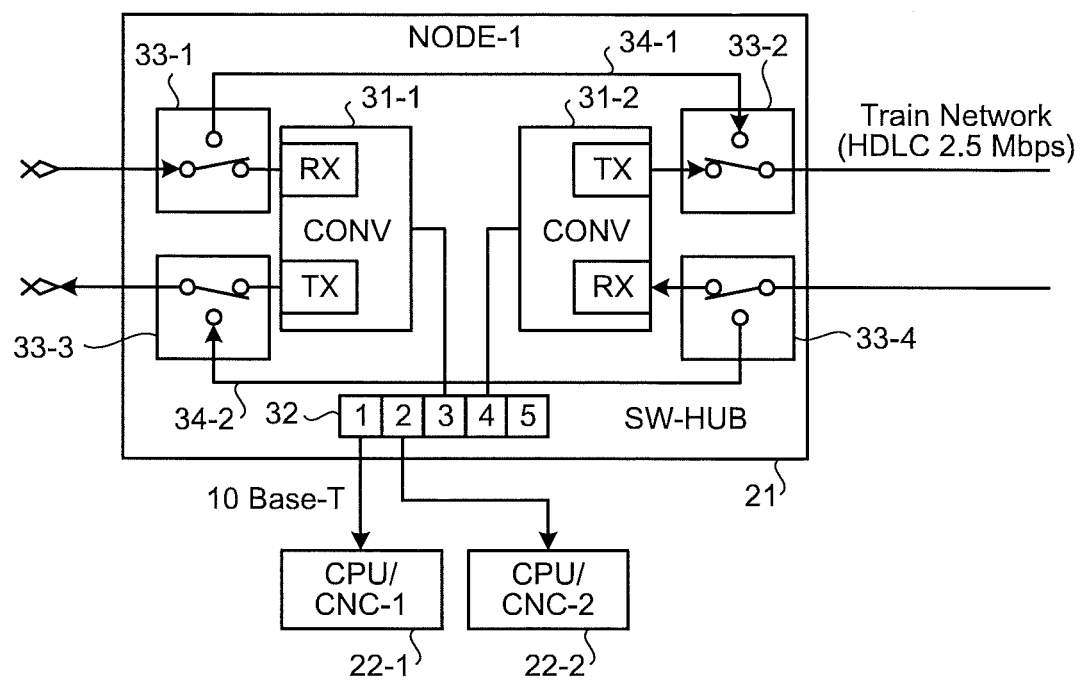
FIG. 3 is a diagram illustrating a configuration of a node device constituted in the railway-train communication apparatus.

Next, a configuration of the node device will be explained. FIG. 3 is a diagram illustrating a configuration of the node device included in the railway-train communication apparatus. In FIG. 3, the node device 21 includes two converters 31 (31-1 and 31-2), a switching hub (SW-HUB) 32, four bypass relays 33 (33-1 to 33-4), and two bypass lines 34 (34-1 and 34-2). The switching hub 32 can use, for example, a standard Ethernet (registered trademark) layer 2 (a layer 2 switch).

Moreover, the converters 31 can use the following specification as a preferable specification.
(1) Function: Signal conversion (HDLC/Ethernet (registered trademark)) in layer 1 (physical layer)/layer 2 (data link layer)
(2) Network interface: 10Base-T (or 100 Base-TX)
(3) Serial link interface:
  (a) Method: AC coupled RS-422 method of DC-bias voltage application (however, application of DC-bias voltage can be switched)
  (b) Differential voltage: 2 V (4 Vp-p)
  (c) Frame format: HDLC (2.5 Mbps)
  (d) DC-bias voltage: 24 V.

The bypass relays 33 can use, for example, a normally-on type mechanical relay. By using a normally-on type relay, the inter-car networks and the converter 31 are connected to each other by a biasing force of the relay in normal times as illustrated in the drawing. On the other hand, when the node device 21 is out of order or abnormal, the inter-car networks are connected to the bypass lines 34 because the relay loses a biasing force. Therefore, data flowing through the inter-car networks bypass the node device 21 to be transmitted to an adjacent node device. By the presence of the bypass relays 33 and the bypass lines 34, a fault or anomaly of the node device 21 can be prevented from spreading to the entire of the railway-train communication system in the train. In addition, the bypass relays 33 are controlled by a fault detecting unit included in the node device 21. More information about the fault detecting unit will be below explained.

(Communication Protocol of the Present System)

Figure 4:
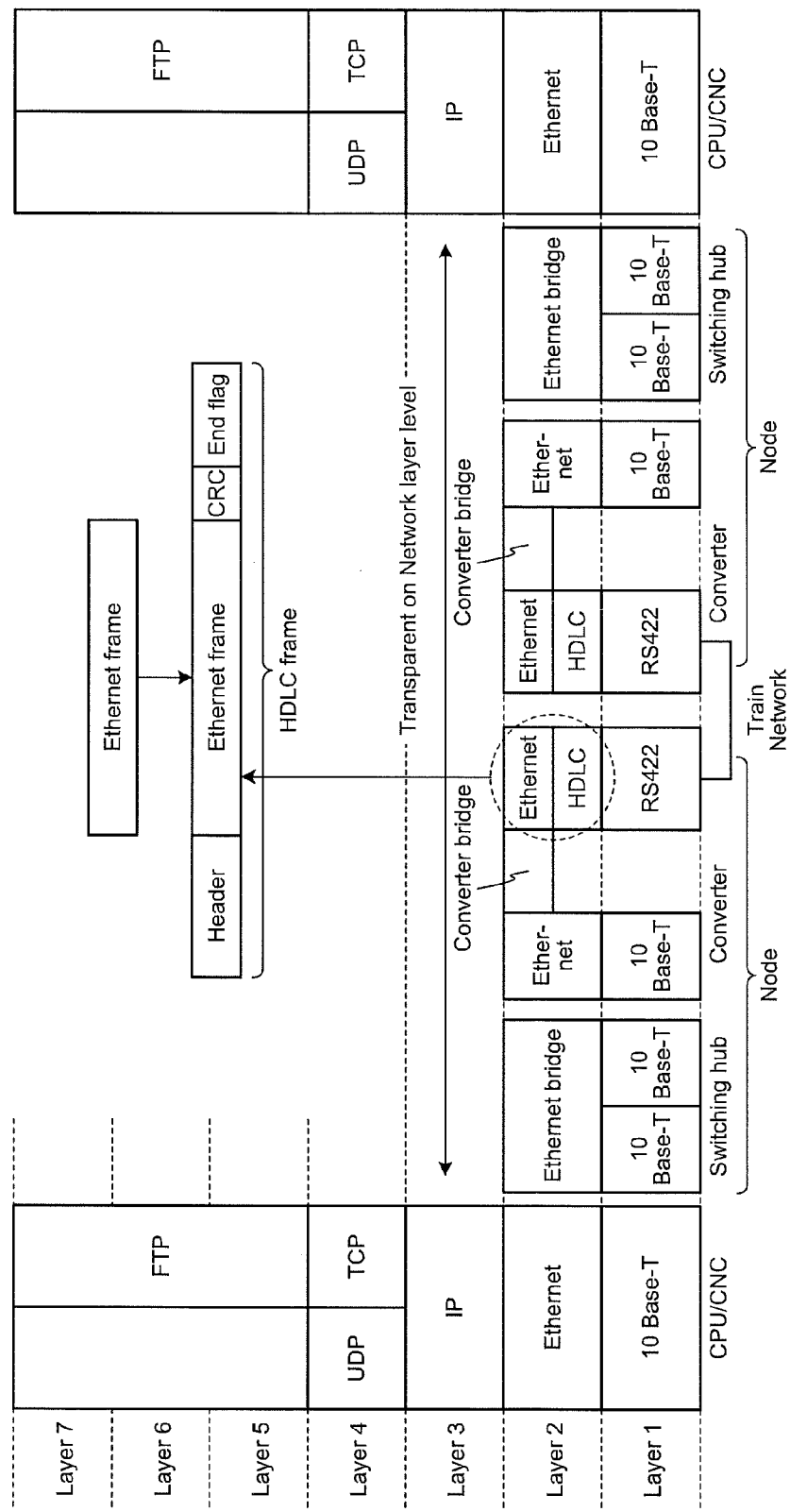
FIG. 4 is a diagram illustrating a network hierarchy in the railway-train communication system according to the present embodiment.

Next, a communication protocol used in the railway-train communication system will be explained with reference to FIG. 3 and FIG. 4. FIG. 4 is a diagram illustrating a network hierarchy in the railway-train communication system according to the present embodiment.

Ethernet (registered trademark) (layer 2) and 10Base-T (layer 1) are used for communication between the network controllers (CPU/CNC) 22 and the switching hub 32. Similarly, Ethernet (registered trademark) (layer 2) and 10Base-T (layer 1) are also used for communication between the switching hub 32 and the converters 31 in the node device 21.

On the other hand, Ethernet (registered trademark) (layer 2: LLC) HDLC (layer 2: MAC) and RS-422 (layer 1) are used for communication between the adjacent converters 31. In other words, as illustrated in FIG. 4, an Ethernet (registered trademark) frame is encapsulated in an HDLC frame.

In this manner, a communication environment based on protocol hierarchy as illustrated in FIG. 4 is provided. Therefore, the railway-train communication system of the present embodiment can perform transparent communication in a layer upper than the network controllers (CPU/CNC), that is to say, a layer not less than a network layer and can secure high concatenation with a connection device in the car and a device of another system concatenated with the present system.

(Configuration of Converter)

Figure 5:
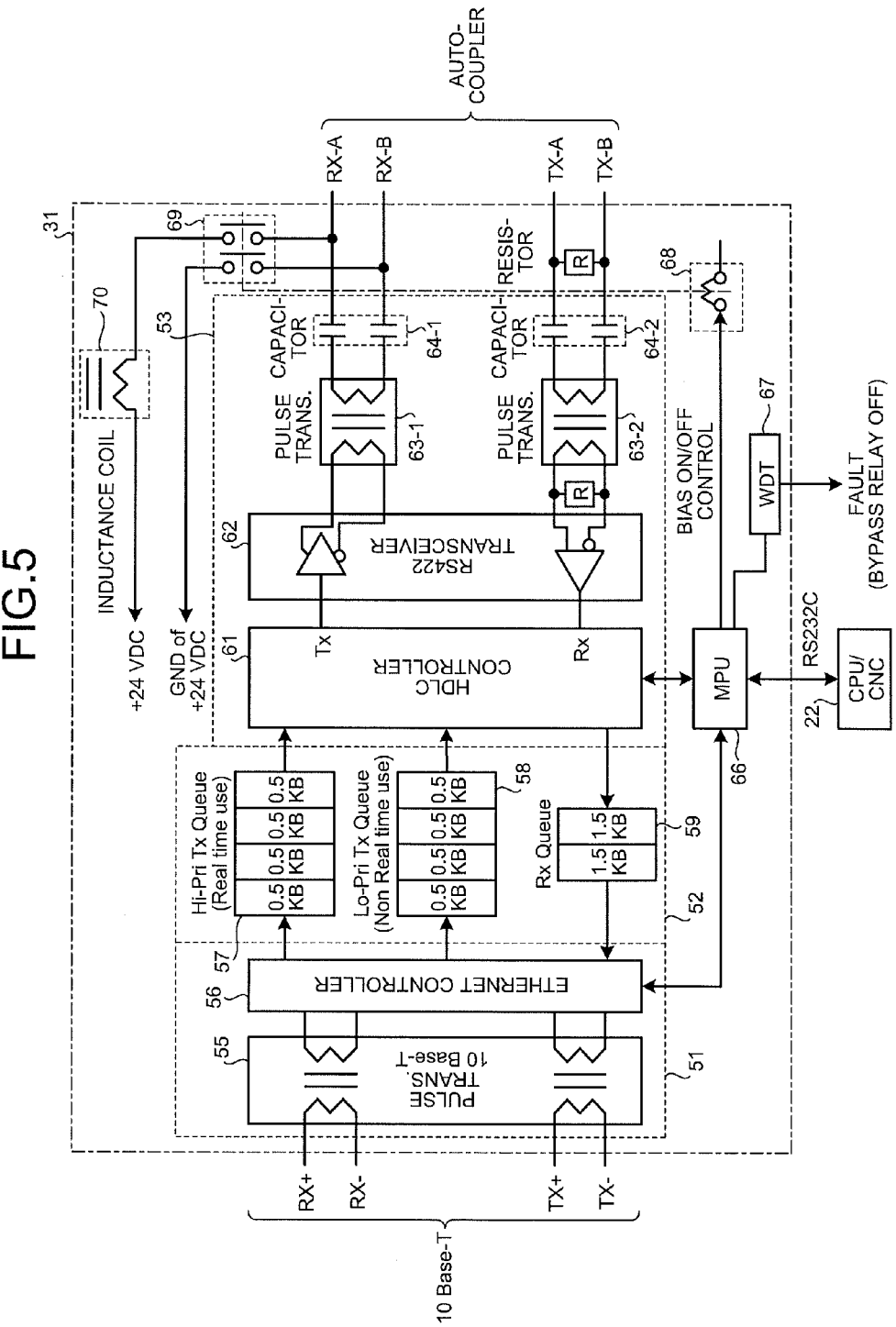
FIG. 5 is a block diagram illustrating a configuration of a converter.

Next, a configuration of the converter will be explained. FIG. 5 is a block diagram illustrating a configuration of the converter. In FIG. 5, the converter 31 includes an Ethernet (registered trademark) transmitter/receiver circuit 51, a buffer memory 52, an HDLC transmitter/receiver circuit 53, a microprocessor (MPU) 66, a watch dog timer (hereinafter, "WDT") 67, a relay 68, a switch 69, and an inductance coil 70. The Ethernet (registered trademark) transmitter/receiver circuit 51 includes a pulse transformer 55 and an Ethernet (registered trademark) controller 56. The buffer memory 52 includes FIFO-type memories 57 to 59. The HDLC transmitter/receiver circuit 53 includes an HDLC controller 61, an RS-422 transceiver 62, pulse transformers 63 (63-1 and 63-2), and capacitors 64 (64-1 and 64-2). The microprocessor 66 is a second controller that controls each component of the converter 31. The WDT 67 monitors an operation of the microprocessor 66. The relay 68 is excited by the microprocessor 66. The switch 69 is controlled to be turned on or off by the relay 68. The inductance coil 70 is provided on +24 VDC line.

In addition, the converter 31 illustrated in FIG. 5 has the following functions.
(1) Speed change function
(2) Relay preference function of message
(3) Poor contact avoiding function in automatic coupler
(4) Fault detecting function
(5) Transmission-path state monitoring function
(6) Connection-mode automatic recognition function Hereinafter, these functions will be explained.

(Speed Change Function)

In FIG. 5, the HDLC transmitter/receiver circuit 53 generates and decodes a HDLC frame. Moreover, as described above, the HDLC frame is made by encapsulating an Ethernet (registered trademark) frame and the encapsulated frame is sent. On the other hand, the Ethernet (registered trademark) transmitter/receiver circuit 51 generates and decodes the Ethernet (registered trademark) frame and changes a signal speed (the HDLC transmitter/receiver circuit side: 10 Mbps->2.5 Mbps and the switching hub side: 2.5 Mbps->10 Mbps). The reason performing the speed change is as follows.

As described above, a 10Base-T cable (for example, a twisted pair cable of category 5) is used for the transmission of the Ethernet (registered trademark) frame. Therefore, a transmission signal has high quality. On the other hand, because the transmission of the HDLC frame is performed through the automatic coupler that connects the car groups, a transmission signal has low quality as described below. For this reason, the speed change is performed from 10 Mbps to 2.5 Mbps in the converter 31 when the conversion is performed from the Ethernet (registered trademark) frame to the HDLC frame.

(Relay Preference Function of Message)

In FIG. 5, the buffer memory 52 is a memory that absorbs a transmission speed difference as described above. The FIFO-type memory 57 constituting the buffer memory 52 is a memory in which high-priority transmitted data are accumulated. On the other hand, the FIFO-type memory 58 is a memory in which low-priority transmitted data are accumulated unlike with the FIFO-type memory 57. Moreover, the FIFO-type memory 59 is a memory in which received data are accumulated. In this case, high-priority data accumulated in the FIFO-type memory 57 is supervisory information (Real time use) such as a control command and an important fault. On the other hand, low-priority data accumulated in the FIFO-type memory 58 is accumulated information (Non-real time use) such as a past operating record.

Moreover, the high-priority data accumulated in the FIFO-type memory 57 is transmitted by using, for example, UDP (layer 4). On the other hand, the low-priority data accumulated in the FIFO-type memory 58 is transmitted by using, for example, TCP (layer 4). Therefore, the Ethernet (registered trademark) controller 56 can determine the highness and lowness of priority based on a transmission protocol that is used in an upper layer. However, without employing these techniques, the Ethernet (registered trademark) controller 56 may provide a field for identifying priority, for example, in a data frame and determine the highness and lowness of priority based on priority information written in the field.

(Poor Contact Avoiding Function in Automatic Coupler)

Figure 6:
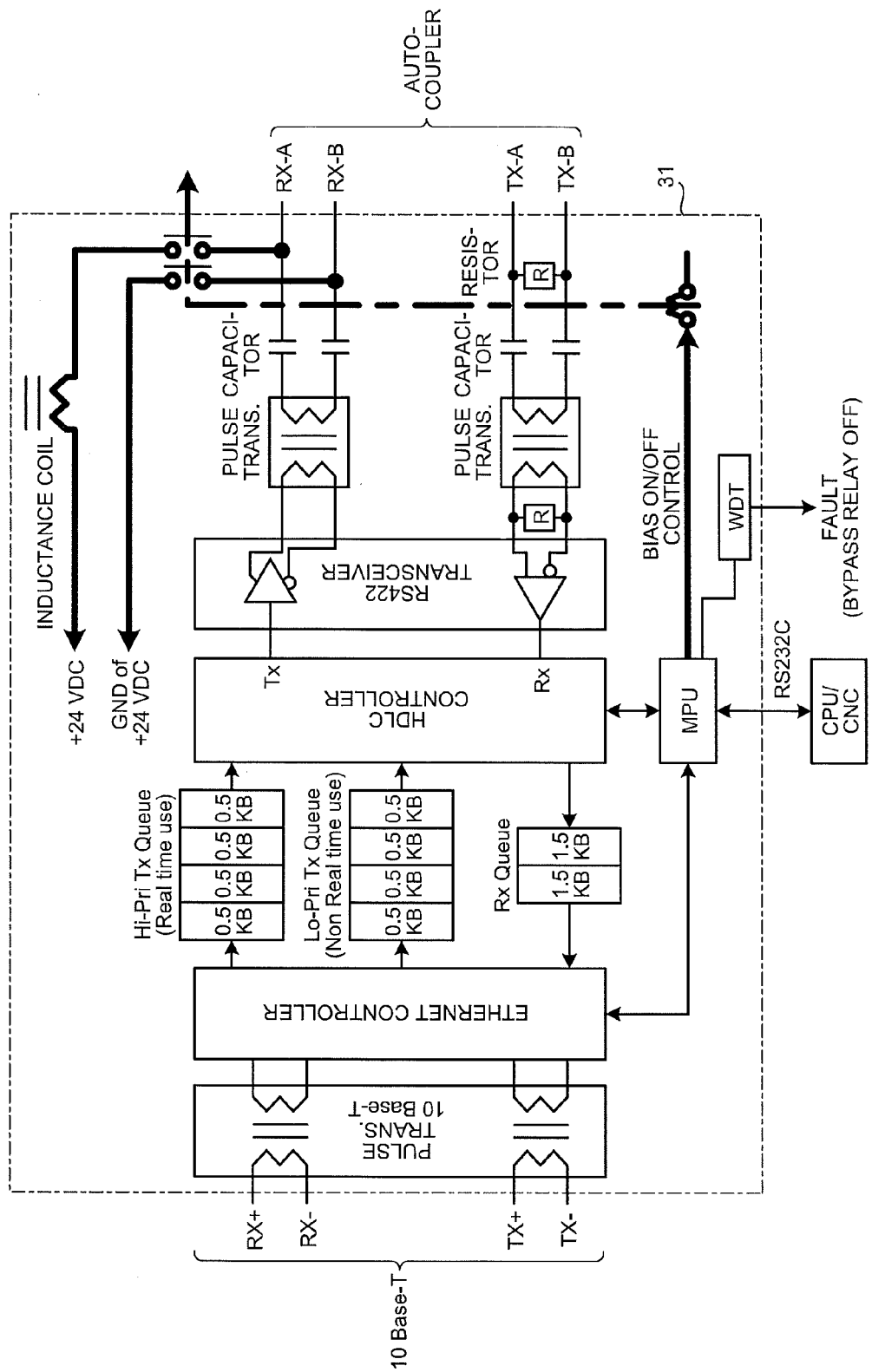
FIG. 6 is a diagram illustrating a state where a fritting circuit provided as a poor contact avoiding function in an automatic coupler is activated.

The poor contact avoiding function will be explained with reference to FIG. 6. FIG. 6 is a diagram illustrating a state where a fritting circuit provided as a poor contact avoiding function in the automatic coupler is activated. The fritting circuit includes the microprocessor 66, the relay 68, the switch 69, the inductance coil 70, and a +24 VDC electric source. An object of fritting is to improve poor contact by an oxide film on a contact area of the automatic coupler. The oxide film on the contact area of the automatic coupler increases a contact resistance of the automatic coupler and thus degrades the quality of transmission signal. On the other hand, because the oxide film is destroyed and the contact resistance of the automatic coupler is decreased by applying a +24 VDC voltage to the automatic coupler, the degradation of the quality of transmission signal can be improved. In this case, applying the +24 VDC voltage to the automatic coupler is performed by exciting the relay 68 and turning on the switch 69 by the control of the microprocessor (MPU) 66. Moreover, applying the +24 VDC voltage to the automatic coupler is performed until a signal output from an adjacent converter is received and is then terminated after the signal output from the adjacent converter is received. However, a voltage applied to the automatic coupler is not limited to +24 V. Because it would be good if the applied voltage is a voltage by which the oxide film of the automatic coupler can be destroyed in a predetermined application time, it is only necessary to set an arbitrary voltage in accordance with materials of the automatic coupler.

(Fault Detecting Function)

The present function will be explained with reference to FIG. 5. The fault detecting function is realized by the WDT 67 included in the converter 31. In other words, the converter 31 can detect its own fault by itself. The WDT 67 includes a timer circuit and monitors the operation of the microprocessor 66. For example, when the timer circuit times out, the WDT 67 determines that the microprocessor 66 does not operate and outputs a control signal (FAULT signal) for controlling the bypass relay 33 to connect the inter-car network to the bypass line 34 (see FIG. 3). Moreover, even when the output of the converter 31 is abnormal, the WDT 67 outputs the FAULT signal to activate the bypass relay 33. In this manner, the WDT 67 included in the converter 31 has a self-contained fault detecting function.

(Transmission-Path State Monitoring Function)

Figure 7:
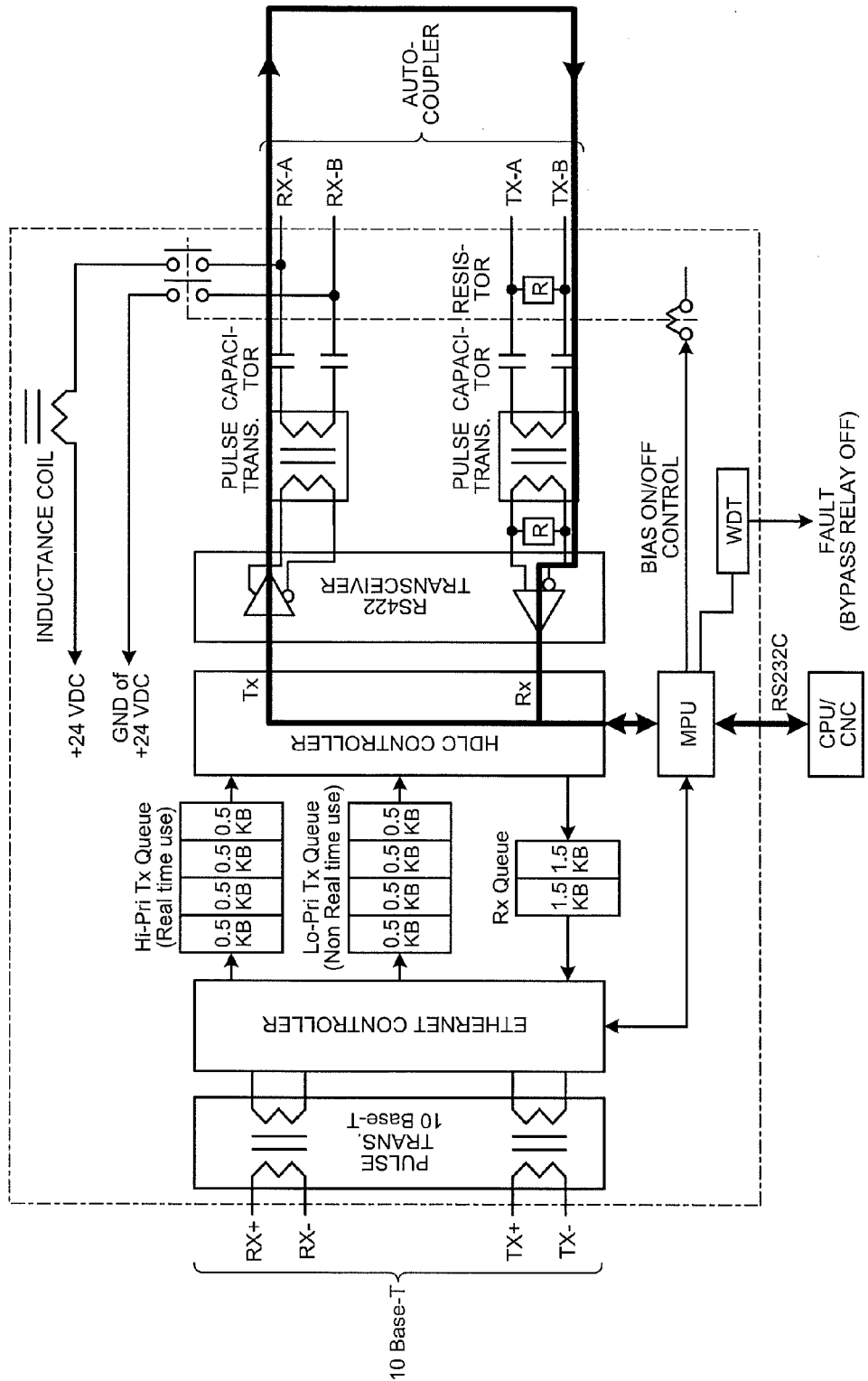
FIG. 7 is a diagram in which a flow of a packet for monitoring the state of transmission path is illustrated on the block diagram corresponding to FIG. 5.

The present function will be explained with reference to FIG. 7. FIG. 7 is a diagram in which a flow of a packet for monitoring the state of transmission path is illustrated on the block diagram corresponding to FIG. 5. In FIG. 7, the microprocessor 66 monitors a packet that flows out from the HDLC transmitter/receiver circuit 53 and a packet that flows into the HDLC transmitter/receiver circuit 53. For example, the microprocessor 66 can monitor a packet by using the state of an incremented serial number and the CRC of an HDLC frame. A monitoring result by the microprocessor 66 is transmitted to the network controller (CPU/CNC) 22 through the serial line such as RS232C. In addition, monitoring information collected by the network controller 22 can be displayed on an indicator or the like of the operation control board 28 (see FIG. 2) via the in-car network (CN).

(Connection-Mode Automatic Recognition Function)

Figure 8:
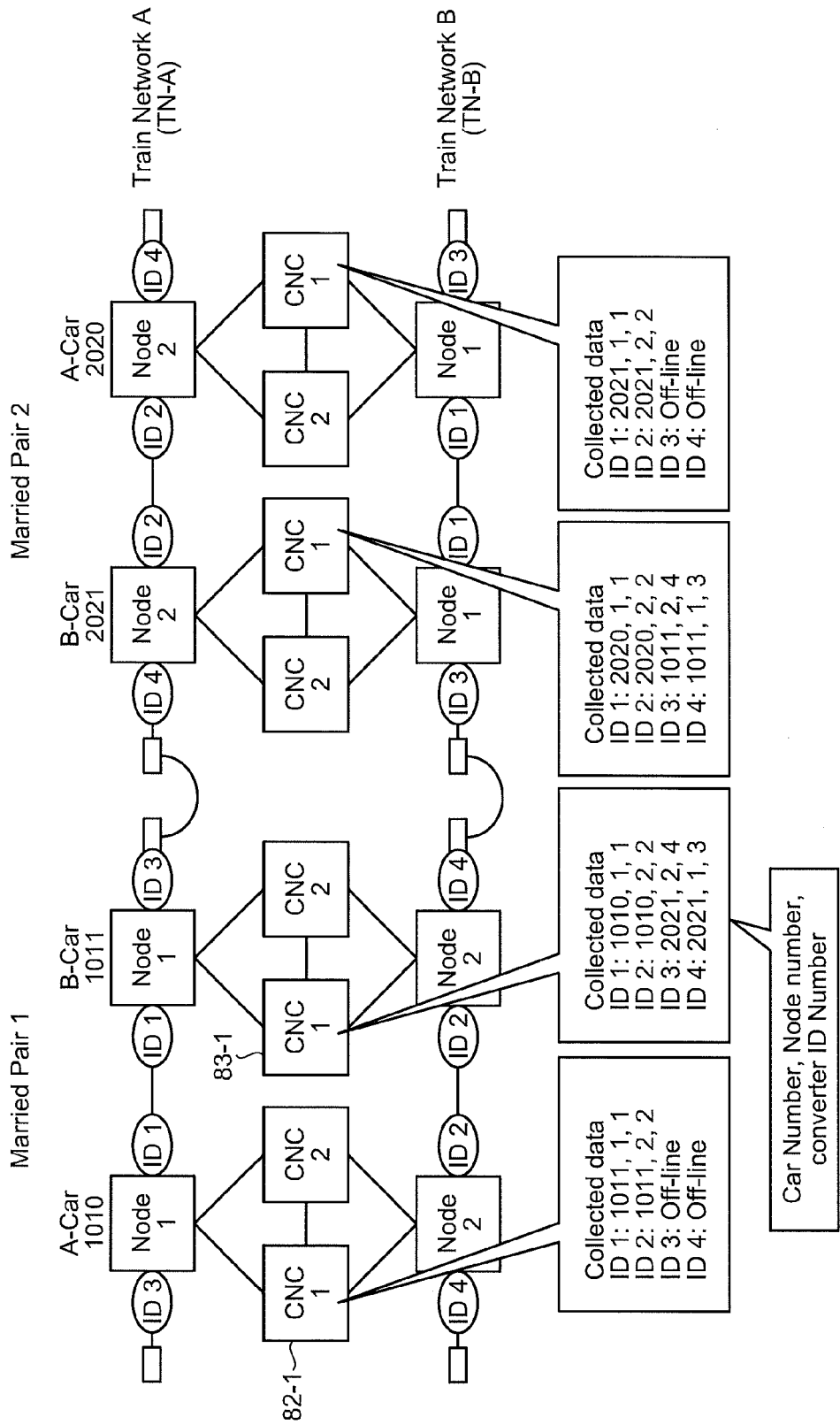
FIG. 8 is a diagram illustrating a connection example for explaining connection state and configuration information of a railway train.
Figure 10:
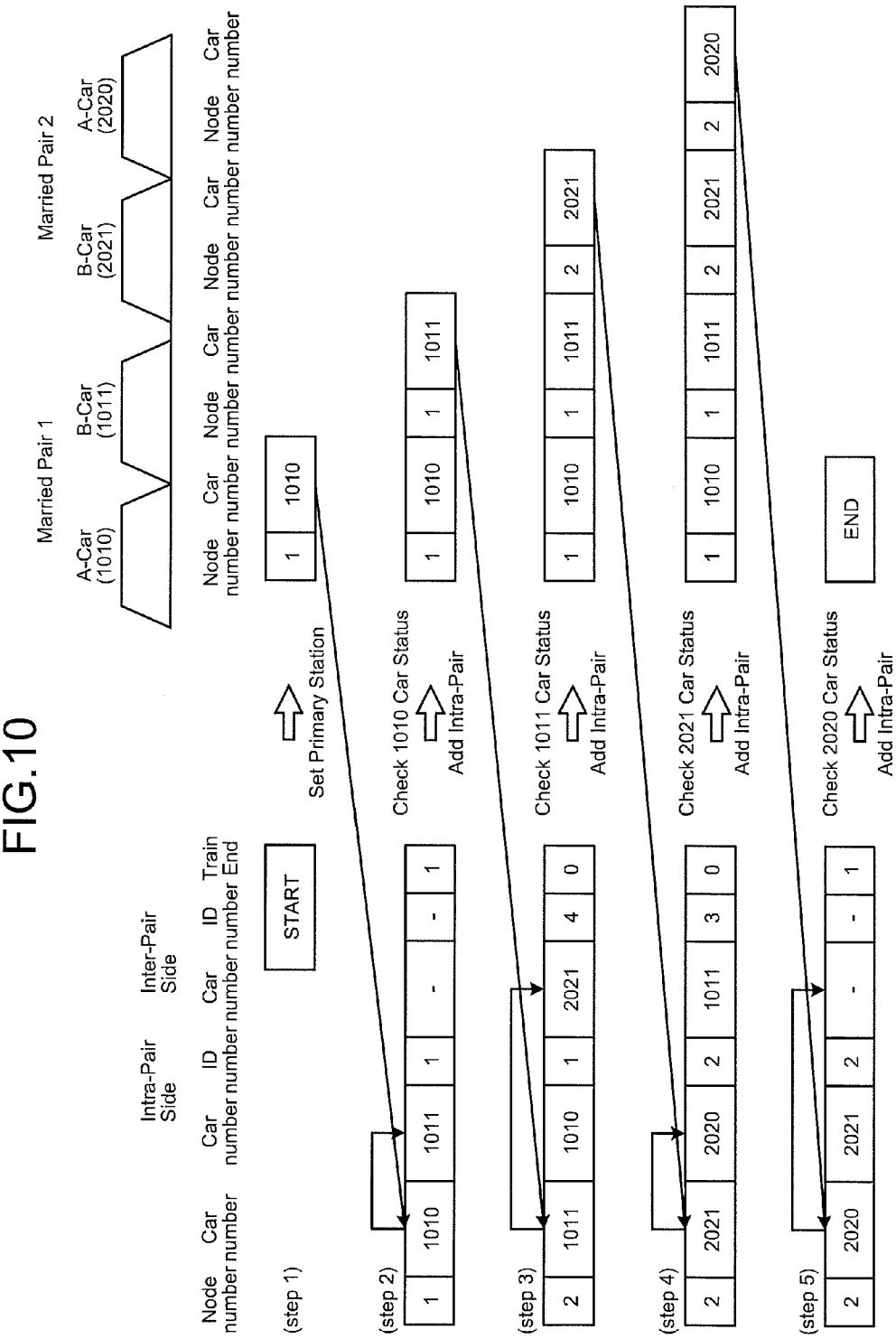
FIG. 10 is a diagram illustrating a determining process of a connection mode in a main network.

The present function will be explained with reference to FIG. 8 to FIG. 10. FIG. 8 is a diagram illustrating a connection example for explaining connection state and configuration information of the railway train. FIG. 9 is a diagram illustrating car status information set in the connection mode illustrated in FIG. 8. FIG. 10 is a diagram illustrating a determining process of a connection mode in a main network.

(Connection-Mode Automatic Recognition Function—Identification of Adjacent Node)

An identification operation of an adjacent node in a connection-mode automatic recognition function will be explained with reference to FIG. 8. In addition, the identification of an adjacent node is performed in a state where the devices are connected to each other and a power is turned on, namely, an online state.

First, the connection state and configuration information of the railway train as illustrated in FIG. 8 will be explained. In FIG. 8, a first car group (Married_Pair_1) consisting of two cars of A-Car and B-Car and a second car group (Married_Pair_2) consisting of two cars of A-Car and B-Car are connected in a connection manner in which the two B-Cars are connected to each other. In other words, a Node-1 device in the first car group and a Node-2 device in the second car group are connected to the main network. Moreover, a Node-2 device in the first car group and a Node-1 device in the second car group are connected to the sub network. Each car further has a car number. For example, A-Car and B-Car of the first car group respectively have "1010" and "1011" and A-Car and B-Car of the second car group respectively have "2020" and "2021".

Each node device exchanges a car number and an ID number of converter (hereinafter, "a converter ID number") by transmitting and receiving signals between adjacent converters. Each network controller (CNC) acquires the car number and converter ID number from four converters within the same car via an RS232C interface. The network controller recognizes the connection state of car based on data collected as described above. In FIG. 8, data collected by the network controller are denoted for each ID number. For example, because recorded data of the network controller 82-1 have no ID3 and ID4 information, it can be recognized that the ID3 and ID4 converters are not connected to any devices. Moreover, because recorded data of the network controller 83-1 have "2021, 2, 4" as ID3, it can be recognized that "the converter ID3" of the present car is connected to "the converter ID4" of "Node-2" of "B-Car (2021)" of "Married_Pair_2".

(Connection-Mode Automatic Recognition Function—Setting of Car Status Information)

A setting operation of car status information in a connection-mode automatic recognition function will be explained with reference to FIG. 9. After the connection state and configuration information of the railway train are recognized, the network controller (CNC) of each car sets the following information as a car status in each node.

(1) Its own node number and car number
(2) In an adjacent node in car group (Intra-Pair_side)
   (a) Car number
   (b) Converter ID number (any number of 1 to 4);
(3) In an adjacent node between car groups (Inter-Pair_side)
   (a) Car number
   (b) Converter ID number (any number of 1 to 4)
(4) Information (End: 1) identifying the end of train In FIG. 9, car status information that is information related to (1) to (4) is illustrated. For example, it can be recognized that "Node-1" of "A-Car (1010)" does not have an adjacent node (Inter-Pair_side) between the car groups and thus is a node located at the end of car. Moreover, in "Node-2" of "B-Car (2021)", it can be recognized that an adjacent node (Intra-Pair_side) in the car group is connected to "the converter ID2" of "the car number 2020" and an adjacent node (Inter-Pair_side) between the car groups is connected to "the converter ID3" of "the car number 1011".

(Connection-mode Automatic Recognition Function—Determination of Connection Mode)

A determination operation of a connection mode in a detailed function of a connection-mode automatic recognition function will be explained with reference to FIG. 10. In FIG. 10, a determining process of a connection mode in a first inter-car network (main network) is illustrated.

The determination of the connection mode is performed according to the following steps.

(1) First, a main station (a main car) is determined and the node number and car number of the main station are set (Step 1). For example, when nodes are connected to a main (sub) network, it is preferable that a car having the node of the smallest node number among the nodes connected to the main (sub) network is determined as the main station.

(2) The network controller (CNC) of the main station determined at Step 1 broadcasts car status information by using a UDP protocol. At this time, car status information of a station at the receiving side is added to the rear of a frame indicative of the connection mode generated at Step 1 (Step 2).

(3) Next, the network controller (CNC) of the station having "node number" and "car number" added to the rear of the frame broadcasts predetermined information by using the UDP protocol on the basis of the held car status information similarly to Step 2 (Step 3 and Step 4).

(4) Each car status information is transmitted to all the network controllers (CNC) in the inter-car network. In this way, all connection modes in the main and sub inter-car networks are recognized (Step 5).

(Grant of IP Address)

Figure 12:
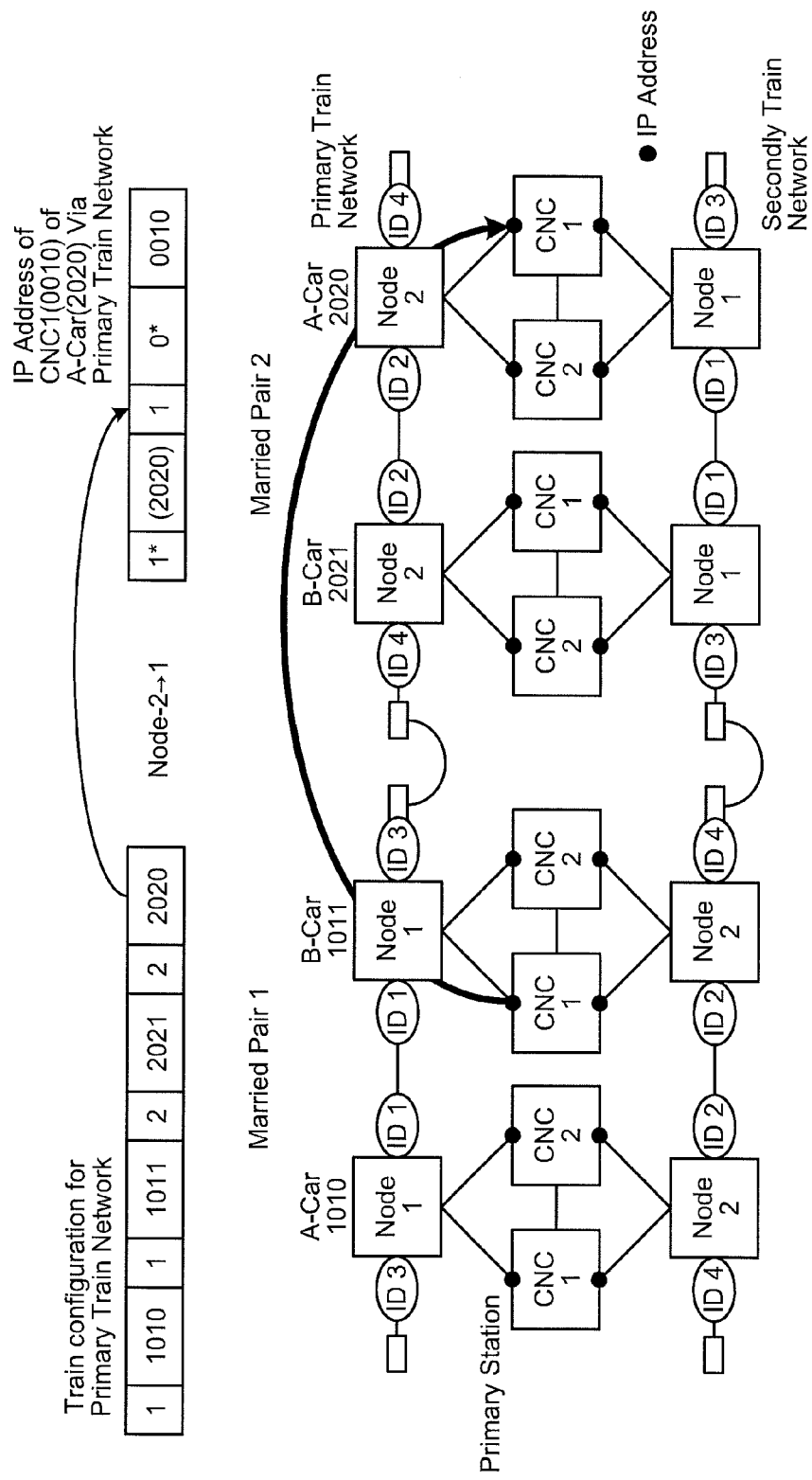
FIG. 12 is a diagram in which an example of a communication path based on the set IP address is illustrated on the configuration diagram corresponding to FIG. 8.

Next, IP address set in the network controller (CNC) will be explained with reference to FIG. 11 and FIG. 12. FIG. 11 is a diagram illustrating an example of an IP address system in the railway-train communication system according to the present embodiment. FIG. 12 is a diagram in which an example of a communication path based on the set IP address is illustrated on the configuration diagram corresponding to FIG. 8. As illustrated in FIG. 12, two IP addresses (for Node-1 and Node-2) are set in each network controller (CNC).

As illustrated in FIG. 11, information required for IP address is a car number (Car_Number), a node number (Node_Number), and an ID number (ID_in_a_car). Among these information, the ID number is an identification number for identifying the network controller (CNC). For example, in FIG. 11, "0010" is set for "CNC1" and "0011" is set for "CNC2". Moreover, the node number is an identification number for identifying the node device. For example, in FIG. 11, "0" is set for "Node-1" and "1" is set for "Node-2". According to the present embodiment, although the IP address system as illustrated in FIG. 11 is employed, another IP address system can be employed.

It is now considered that predetermined data is transmitted from "CNC1" of "B-Car (1011)" to "CNC1" of "A-Car (2020)" via "Node-1". In this case, node-number information of "CNC1" of "A-Car (2020)" is required. It is found that the node number of "CNC1" of "A-Car (2020)" is "2" from the connection-mode information (see FIG. 10 and FIG. 12) of the main inter-car network. For this reason, IP address for transmitting the predetermined data from "CNC1" of "B-Car (1011)" to "CNC1" of "A-Car (2020)" via "Node-1" becomes IP address as illustrated in FIG. 12.

In this manner, in each network controller of the railway-train communication apparatus provided in each car, a predetermined IP address is set for a connecting point between each network controller and each node device connected to the inter-car network. A desired communication can be performed by using the IP address. For this reason, for example, if a general-purpose terminal is only inserted into a vacant port of the switching hub of each node device, the inserted terminal can communicate with another terminal and a terminal that is connected to an external network connected to the inter-car network. Moreover, because system construction is performed based on a standard specification, a display, a monitor, and so on using an existing general-purpose protocol and a general-purpose application can be constituted. Therefore, cost for system construction and system maintenance can be reduced.

As described above, according to the railway-train communication apparatus of the present embodiment, the first and second converters that perform mutual signal conversion between the HDLC signal and the Ethernet (registered trademark) signal are connected to the switching hub that is connected to the network controllers. Therefore, the adaptability to the transmission path having low signal quality can be secured and the certainty of data transmission can be improved.

Although the railway-train communication apparatus according to the present embodiment has a dual-system network controller, the railway-train communication apparatus may have a single configuration without a redundant system.

According to the present embodiment, although the railway-train communication apparatus has a dual-system inter-car network, the railway-train communication apparatus may have a single configuration without a redundant system. In this case, the node device also has a single configuration. In this way, it is not necessary that the network controller has a dual system.

In the railway-train communication apparatus of the present embodiment, the transmission speed of the Ethernet (registered trademark) signal is 10 Mbps and the transmission speed of the HDLC signal is 2.5 Mbps. In accordance with the situation of the transmission path, the transmission speed of the HDLC signal can be changed to be larger or smaller than 2.5 Mbps.

Moreover, in the railway-train communication apparatus of the present embodiment, a fritting circuit is used as a poor contact avoiding unit of the automatic coupler. However, the fritting circuit is unnecessary when constituting a communication transmission path without using the automatic coupler. In addition, even when the automatic coupler is used, the fritting circuit is unnecessary when the material of the automatic coupler has excellent resistance to fritting and sufficient transmission quality can be also secured by using an HDLC signal of the changed speed.

INDUSTRIAL APPLICABILITY

As described above, the railway-train communication apparatus according to the present invention is useful as an invention that is capable of being applied to a transmission path having low signal quality in a railway-train communication system.

The invention claimed is:

1. A railway-train communication apparatus that performs transmission processes of transmitting a first type of transmission signal flowing through an inter-car network constructed between cars of a railway train and a second type of transmission signal flowing through an in-car network constructed in each of the cars, the railway-train communication apparatus comprising:

a node device that is provided in each of the cars, the node device including:
  a first signal converter and a second signal converter each performing a signal conversion and a transmission speed conversion between the first type of transmission signal and the second type of transmission signal,
  a layer 2 switch arranged between the first signal converter and the second signal converter for connecting the first signal converter and the second signal converter;
  a first switch arranged between one of a first transmission path constituting the inter-car network and a reception terminal of the first signal converter,
  a second switch arranged between one of a second transmission path constituting the inter-car network and a transmission terminal of the second signal converter,
  a third switch arranged between other of the first transmission path and a transmission terminal of the first signal converter,
  a fourth switch arranged between other of the second transmission path and a reception terminal of the second signal converter,
  a first bypass line that connects the one of the first transmission path and the one of the second transmission path, and
  a second bypass line that connects the other of the first transmission path and the other of the second transmission path, wherein
  each of the first signal converter and the second signal converter includes a second controller that monitors a flow of the first type of transmission signal, and the second controller transmits a result of monitoring the first type of transmission signal to a first controller via a serial line, and wherein
  each of the first signal converter and the second signal converter includes a fault detecting unit that detects a fault of the second controller, and when the fault of the second controller is detected, the fault detecting unit performs a control of switching the first switch and the second switch to the first bypass line and switching the third switch and the fourth switch to the second bypass line, and
the first controller that is connected to the layer 2 switch and controls signal transmission between the inter-car network and the in-car network, wherein
the first signal converter converts the first type of transmission signal received from an adjacent inter-car network on a first side into the second type of transmission signal and outputs the second type of transmission signal to the layer 2 switch, and converts the second type of transmission signal received from the layer 2 switch into the first type of transmission signal and outputs the first type of transmission signal to the adjacent inter-car network on the first side, and
the second signal converter converts the first type of transmission signal received from an adjacent inter-car network on a second side into the second type of transmission signal and outputs the second type of transmission signal to the layer 2 switch, and converts the second type of transmission signal received from the layer 2 switch into the first type of transmission signal and outputs the first type of transmission signal to the adjacent inter-car network on the second side, and wherein
each of the first signal converter and the second signal converter includes at least two types of buffer memories for compensating a difference in transmission speed between the first type of transmission signal and the second type of transmission signal,
  the buffer memories are provided in a stage before a converting unit that converts the second type of transmission signal to the first type of transmission signal,
  one of the buffer memories is a buffer memory in which high-priority data is accumulated, and the other of the buffer memories is a buffer memory in which low-priority data is accumulated, and
  a determining unit that determines a highness and lowness of priority and outputs data to the at least two types of buffer memories based on the priority.

2. The railway-train communication apparatus according to claim 1, wherein the second type of transmission signal is encapsulated in the first type of transmission signal and is transmitted to the inter-car network.

3. The railway-train communication apparatus according to claim 1, wherein
  at least a part of the cars in the railway train are coupled via an automatic coupler and a transmission path forming the inter-car network between the cars coupled via the automatic coupler is constructed by using an electric contact of the automatic coupler,
  each of the first signal converter and the second signal converter includes a direct-current voltage applying circuit that applies a predetermined direct-current voltage to the electric contact, and
  the second controller controls the direct-current voltage applying circuit to apply the direct-current voltage to the electric contact so as to reduce a contact resistance by destroying an oxide film on the electric contact.

4. The railway-train communication apparatus according to claim 3, wherein a period of applying the direct-current voltage is determined based on the result of monitoring the first type of transmission signal.

5. The railway-train communication apparatus according to claim 1, wherein the first switch to the fourth switch are normally-on type relays.

6. The railway-train communication apparatus according to claim 1, wherein the layer 2 switch is a switching hub.

7. The railway-train communication apparatus according to claim 1, wherein
  the first type of transmission signal is a high-level data link signal, and
  the second type of transmission signal is an Ethernet signal.

8. The railway-train communication apparatus according to claim 7, wherein
  a transmission speed of the Ethernet signal is either one of 10 Mbps and 100 Mbps, and
  a transmission speed of the high-level data link signal is 2.5 Mbps.

9. The railway-train communication apparatus according to claim 1, comprising
  two of said node devices and two of said first controllers, and wherein
  each of the two node devices is connected to the two first controllers to construct a redundant dual system.

10. The railway-train communication apparatus according to claim 1, wherein each of the first signal converter and the second signal converter is assigned with at least a car number and a signal converter identification number as information for recognizing a connection configuration of the railway train.

11. The railway-train communication apparatus according to claim 10, wherein a predetermined Internet-protocol address is set for a connecting point between the first controller and the node device.

12. The railway-train communication apparatus according to claim 11, wherein the Internet-protocol address is set based on the car number, an identification number of the node device, and an identification number of the first controller.

13. The railway-train communication apparatus according to claim 1, wherein each of the first signal converter and the second signal converter is assigned with information indicating an end of the railway train as information for recognizing a connection configuration of the railway train.

* * * * *